United States Patent Office 3,705,850
Patented Dec. 12, 1972

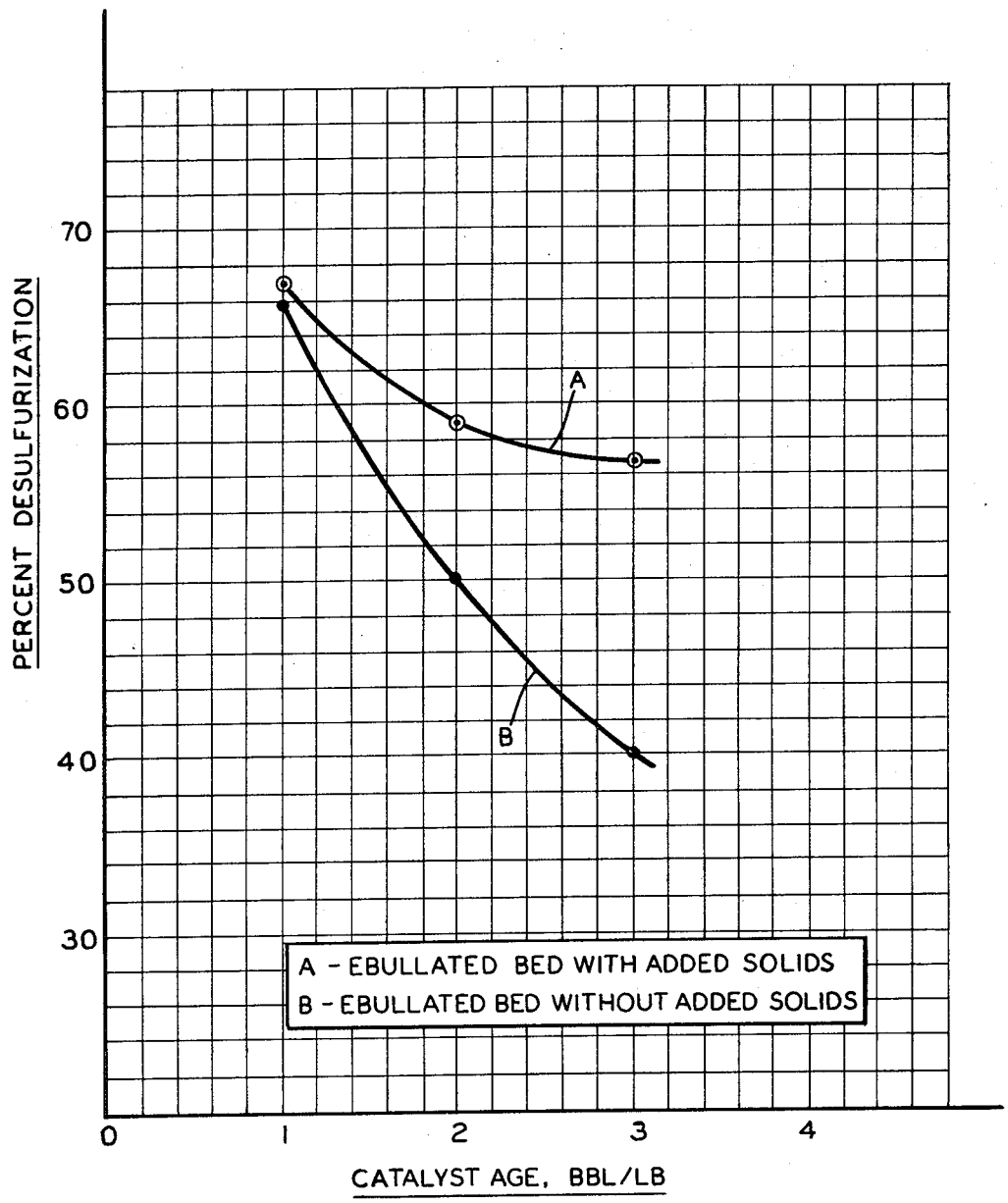

3,705,850
MULTIFUNCTION CONTACTING PROCESS
Ronald H. Wolk, Lawrence Township, Mercer County, N.J., assignor to Hydrocarbon Research, Inc., New York, N.Y.
Continuation of abandoned application Ser. No. 742,785, July 5, 1968. This application Jan. 8, 1971, Ser. No. 105,115
Int. Cl. C10g *13/18, 23/02, 25/06*
U.S. Cl. 208—127                     6 Claims

ABSTRACT OF THE DISCLOSURE

A process for contacting liquid and gaseous reactants with two different particulate contact solids, each having a different specific physiochemical function relative to said reactants. The reactants are passed upwardly through a bed of one of the solids which is composed of particles having sizes greater than 40 mesh, U.S., at velocities whereby the bed is expanded and designated as ebullated. The second solid is a powder, the particles of which are in a size range less than 40 mesh, U.S., and has a transport velocity equivalent to that required for 20 to 100% expansion of the larger solids which constitute the ebullated bed. The powder is introduced to the liquid feed prior to its entering the contact zone and the powder transverses through and is removed from the contact zone along with the reaction products, while the larger contact solids are retained in the zone.

---

This application is a continuation of Ser. No. 742,785, filed July 5, 1968, now abandoned.

BACKGROUND OF THE INVENTION

This invention pertains to a process for carrying out various chemical reactions between liquid and gaseous reactants in presence of solid contacting material. More particularly, it pertains to processes and reactions, such as hydrogenation of hydrocarbon oils for refining purposes, desulfurization or for hydrocracking hydrocarbon materials to gasoline and other valuable products, hydrogenation of animal and vegetable fats and oils so as to convert them to refined edible products, various halogenation processes, such as chlorination of toluene to form benzylchloride and the clorination of paraffin wax, oxidation processes employing air or purified oxygen, such as the oxidation of acid aldehyde to acetic acid, hydrogenation of higher organic oxygenates such as aldehydes and ketones to alcohols, sulfonation and nitration processes, like reacting benzene vapor with sulfuric acid and amidization processes such as contacting nicotinic acid with ammonia.

In recent years, a novel gas-liquid contacting process has been developed for use in chemically reacting liquid and gaseous materials in the presence of a mass of particulate contact agent. This process has been designated as the "ebullated bed contacting system" and is disclosed in the Johanson U.S. patent, Re. 25,770. This method of contacting has numerous advantages over the fixed bed and slurry contacting processes known prior to that time. Application of the ebullated bed to the field of petroleum refining, more specifically, residuum hydrocracking and desulfurization, has been extensive. Additionally, this contacting system has also been applied to the hydrogenative treatment of fats and oils, and the treatment of wood for pulping purposes and of lignin and lignin-containing liquors for the production of valuable chemicals therefrom. It is thus apparent that this particulate contacting process has applications in a broad range of chemical reactions, where contact with a solid is required.

While in the above mentioned reaction, the particulate solid used is normally a catalyst, it is, of course, not necessary that the solid material have specific chemical reactivity. It is sometimes, sufficient, for instance, simply to use an inert particulate solid in order to provide a surface on which to carry out the specific chemical reaction. In other reactions, either acidic or basic reactive sites are required and the catalyst must thereby possess these particular types of physiochemical functions relative to the chemical reactants.

A basic problem inherent in most chemical reactions which require catalysts or solid inert surfaces to facilitate their being carried out is that impurities arising either in the reactant feed materials themselves or as by-products of the reaction are produced which build up in the reaction mixture. These impurities tend to decrease the effectiveness of the contacting solid to the detriment of the principal chemical reaction being carried out. For example, in the cases where the contacting material is required to have a large surface area to provide sites for the specific reactants to combine, the impurities or by-products, as the case may be, may deposit on the required surfaces and thereby make these surfaces unavailable to the principal reactants. Alternatively, where the contacting material has catalytic activity, it is frequency observed that the impurities have an affinity for the catalyst and tend to deactivae it, resuling in detrimental effects on process yield and quality.

Specific examples include the desulfurization of petroleum residua which contains a high metals content. Such metals tend to deposit on the catalyst normally used in those processes and result in severe deactivation thereof. Additionally, nitrogen compounds present in petroleum materials would tend to deactivate acid sites which might be contained on such catalysts. In any case, each specific chemical reaction as described above has particular poisons which tend to decrease the efficiency of the contact material and which has detrimental effect on both product yield and quality in addition to the overall economics of the given process.

SUMMARY OF THE INVENTION

We have discovered a method by which chemical reactions of the type heretofore described may be carried out in the presence of an impurity-containing reaction mixture without being penalized by the decreased efficiency and/or deactivation of the contact material by such impurities. More particularly, we have found that, by using a first contact material in the ebullated bed process which contains particles having sizes larger than 40 mesh, U.S., and by introducing to the feed material, prior to its entrance into the reaction zone, a second powdered contacting material which has a narrow size distribution in the range smaller than 40 mesh, U.S., a particular affinity for the impurity and a transport velocity equivalent to that required to give between 20 to 100% expansion of the first contact material constituting the bed, the effect of the impurity on said first contacting material can be significanly minimized.

Additionally, we have found that by utilizing the two contacting materials as specified above, it is possible to avoid build up of the second powdered contact material in the reaction zone. In the ebullated bed, because of the lower transport velocity and decreased size of this second contact material and due to the nature of the expansion and random motion of the first material in the ebullated bed, the second materials flows through the bed and out of the reaction zone along with the reaction products. It may then easily be removed as a solid from the liquid reactor effluents.

Thus, we have found a method by which two contacting materials having different specific functions in a chemical reaction, may be contacted in said chemical reaction at the same time without substantial interference of one with the given physiochemical function of the other. Additionally, our process allows the removal of one of said contact agents with the effluent from the reaction zone, thereby avoiding build-up of contaminated or spent contacting materials.

DESCRIPTION OF THE DRAWING

The drawing is a graphical comparison of the rate of decrease of catalyst desulfurization activity with catalyst age for processes with and without the invention.

DESCRIPTION OF THE PREFERRED EMBODIMENT

While our invention is applicable to a broad variety of chemical reactions and processes in which it would be particularly advantageous to effect minimization of a deleterious side reaction or to remove deleterious agents and impurities from the system while allowing the main product producing reaction to continue without hinderance, we have set forth below specific examples of our invention applied to the field of hydro-conversion and hydrodesulfurization of hydrocarbon feed materials:

EXAMPLE I

| Run | 1 | 2 |
|---|---|---|
| Catalyst | (1) | (1) |
| Added solids | None | (2) |
| Solids addition rate, lb./bbl | ---- | 1 |
| Nitrogen in feed, p.p.m. | 200 | 200 |
| Nitrogen pick-up, lb./lb. of added solids | ---- | 0.07 |
| Space velocity, $V_f/hr./V_r$ | 0.5 | 1.0 |
| | | |
| Products, velocity percent on fresh feed: | | |
| $C_4$ | 2.8 | 2.8 |
| $C_5$–180° F. | 7.5 | 7.5 |
| 180–350° F. | 24.8 | 24.8 |
| 350–400° F. | 6.0 | 6.0 |
| 400–650° F. | 69.3 | 69.3 |
| Total $C_4$ plus liquid | 110.4 | 110.4 |

[1] 1/16 extrudates of N-W-S on silica=alumina.
[2] 75% $SiO_2$ 25% $Al_2O_3$ powder.

Example I illustrates the use of our invention to effect the removal of a nitrogen impurity in a hydro-conversion process of a gas oil feed material. Normally, the nitrogen containing compounds in the feed would have a severe deactivating affect on the main hydrocracking catalyst, such that a significantly higher severity of reaction conditions would be required to achieve the same product yield and distribution. By addition, however, of a powdered, nitrogen specific agent to the feed as shown in Run 2, prior to its introduction to the ebullated reaction zone, it was possible to preferentially remove nitrogen from the reaction mixture by deposition on the powdered solids. This resulted in enhanced hydrocracking activity of the large size catalyst of sulfided nickel-tungsten on silica-alumina, since it was unhindered by nitrogen poisoning.

The drawing illustrates the use of our invention in a process for the desulfurization of a petroleum residuum having a high metals content. Metals, such as vanadium and nickel, are very often present in these feed materials in the form of chelated type compounds. Upon contacting in a catalytic desulfurization process, substantial deactivation of the catalyst results from deposition of the metals from the feed onto the catalyst surfaces. Such metal deposition also results in clogging of the pores of the catalyst, thereby making it necessary, from time to time, to replace the catalytic agent. As a result, catalyst cost due to loss of activity is one of the major economic considerations for such processes.

In the drawing, curve B shows the rate of decrease in desulfurization activity of a catalyst with increasing catalyst age. The feed used for this run was a Venezuelan atmospheric residuum containing 500 p.p.m. of nickel and vanadium total. Curve A represents the rate of change in catalyst activity when high surface area alumina having a narrow size distribution in the range from about 100 to 200 mesh, U.S., is introduced to the feed prior to its entrance into the contact zone, when said catalyst is introduced into the reactor at a rate of 0.2 lb./bbl. Inspection of the spent catalyst from the run depicted by curve B showed a 15 percent metals content, i.e., nickel plus vanadium, while that from the run depicted by curve A contained only 7 percent. Thus, with our invention, the rate of decrease in catalyst activity was cut almost in half.

Our invention is particularly applicable to processes involving the catalytic hydro-conversion or hydrodesulfurization of materials such as petroleum atmospheric distillation bottoms, petroleum vacuum distillation bottoms, shale oil, shale oil residues, tar sands, distillate gas oils, deasphalted gas oils and coal derived hydrocarbons and hydrocarbon residues. Conditions for such processes are usually within temperature ranges from about 500° F. to about 900° F., total pressure from about 800 p.s.i.g. to about 3000 p.s.i.g., hydrogen throughputs from about 2500 to about 8000 standard cubic feet per barrel and total space velocity of at least 0.25 $V_f/hr./V_r$.

Additionally, our invention is uniquely applicable to ebullated bed processes for the hydrogenation of triglyceride containing feed. Such processes are normally carried out at reaction temperatures between about 600 and about 850° F. and total pressures within the range from about 500 to about 2000 p.s.i.g. with hydrogen partial pressures within the range from about 250 p.s.i.g. to about 1800 p.s.i.g. and hydrogen rates between about 2.0 to about 4.0 pounds of hydrogen per 100 pounds of feed.

In the above type reactions, i.e., hydrogenation of petroleum or coal derived hydrocarbons or the hydrogenation of triglyceride containing feeds, the catalysts normally used are composed of materials such as alumina or combinations of silica and alumina promoted with metals or compounds of metals selected from Groups VIb and VIII of the Periodic Table. The powdered solids for such processes, on the other hand, may be composed of the catalytic materials described above or materials such as silica gel, clay, boria-alumina, silica-magnesia, alumina or diatomaceous earth.

Processes for the hydrogenation of lignin feeds, which also include derivatives of lignin such as alkalilignosulfates and sulfite liquors from pulping processes are usually carried out at a combination of reaction conditions such that any water present in the reactor is present as a vapor. Typical ranges for such conditions are a temperature between about 300° F. to about 800° F. and hydrogen partial pressures from about 250 p.s.i.g. to about 2500 p.s.i.g. Generally, in lignin hydrogenation processes, the catalyst is a material composed of elements or their corresponding oxides and sulfides from Groups V, VI, or VIII of the Periodic Table. These catalysts are often used in conjunction with a support material such as alumina, alumina activated with fluoride or silica and alumina. The powdered solids in this case may, on the other hand, be composed not only of the catalytic materials described above, but also may consist of silica gel, clay, boria-alumina, silica-magnesia, alumina or diatomaceous earth.

Generally, our invention is applicable to those chemical processes which are carried out by passing a liquid reactant feed material together with a gaseous reactant, upwardly through a contact zone containing a particulate contact agent having a size in the range larger than 40 mesh, U.S. wherein the velocities of said liquid and gas are such that the bed is expanded at least 10% over its volume in the settled state, and in which the particles are placed in random motion. Such a contacting system has been designated as the ebullated contacting system. It is particularly characterized by the existence of an interface above which a relatively low catalyst concentration exists and below which a relatively high catalyst concentration exists. The catalyst concentration above this interface is sufficiently small that essentially no or insignificant amounts of catalyst are carried out of the reaction zone with the reactor effluent.

Applied to such a process, our invention comprises the improvement of adding to the feed material a powdered contacting solid which has particles in the size range less than 40 U.S. mesh, and which has a transport velocity equivalent to that velocity required to effect a 20 to 100% expansion of the large size catalyst in the reaction zone.

The added powdered solid may be inert or may possess catalytic activity, the same as or different from that possessed by the contact agent in the reaction zone, assuming it also has catalytic activity. In either case, the added powdered contact agent has a specific physiochemical function which is either different from or more effective than that physiochemical function possessed by the large size contact agent in the reaction zone. This allows the powdered contact agent to react with or render ineffective by-products and/or impurities in the reaction zone which would normally have deleterious effects upon the action of the large contact agent.

Additionally, the lower transport velocity of the powdered contact agent as required above, allows said powder to be carried out of the reaction zone with the product effluent while the larger size catalyst remains in the zone for further utilization in the reaction. This has the distinct advantage of avoiding any build up of contaminated or deactivated powdered contact agent in the reaction zone; thus, avoiding periodic shut-downs to cleanse the reaction zone, to remove such powder from the zone, etc. With respect to the ebullated bed contacting system, transport velocity is defined as that liquid velocity required to obtain infinite expansion of the solid. Thus, at a velocity equivalent to or greater than the transport velocity, none of the solid will be retained in the reaction zone.

Although the above example and discussion discloses a preferred mode of embodiment of our invention, it is recognized that from such disclosure, many modifications will be obvious to those skilled in the art and, it is understood, therefore, that our invention is not limited to only those specific methods, steps or combination or sequence of method steps described, but covers all equivalent steps or methods that may fall within the scope of the appended claims.

I claim:
1. In an improved process for the hydrodesulfurization of a liquid hydrocarbon feed of high metal content wherein said liquid hydrocarbon feed and a hydrogen-containing gas are fed upwardly through a reaction zone containing a bed of particulate hydrodesulfurization catalyst which is maintained in random motion in the liquid with minimum carryover of the catalyst with the liquid effluent, under temperature and pressure conditions suitable for hydrodesulfurization to produce a gaseous and liquid effluent wherein the improvement comprises:
   (a) maintaining the particulate catalyst size in said bed in a narrow range larger than 40 mesh USS;
   (b) adding a contact particle to said liquid hydrocarbon feed prior to its entry into said reaction zone, said contact particle having a size in a narrow range smaller than 40 mesh USS and wherein said contact particle is a high surface area alumina having affinity for the metal content of said hydrocarbon;
   (c) passing said mixture of liquid hydrocarbon and contact particle upwardly through said reaction zone;
   (d) maintaining the velocity of said mixture and hydrogen-containing gas sufficient so as to expand said bed of catalyst to between 20 and 100 percent of its settled state;
   (e) removing metals-containing alumina particle from the reaction zone in the liquid effluent;
   (f) separating said alumina particle from said effluent; and
   (g) recovering a desulfurized hydrocarbon from said effluent.

2. The process of claim 1 wherein said catalyst is cobalt molybdate on alumina.

3. The process of claim 1 wherein the reaction zone is operated at a temperature between 500° and 900° F., a pressure between 800 and 3000 p.s.i.g., a hydrogen throughput from 2500 to about 8000 standard cubic feet per barrel and total space velocity of at least 0.25 $V_f/hr./V_r$.

4. In an improved process for the hydrocracking of liquid gas-oil feed of high nitrogen content wherein said liquid gas-oil feed and a hydrogen-containing gas are fed upwardly through a reaction zone containing a bed of particulate hydrocracking catalyst which is maintained in random motion in the liquid with minimum carryover of the catalyst with the liquid effluent, under temperature and pressure conditions suitable for hydrocracking to produce a gaseous and liquid effluent wherein the improvement comprises:
   (a) maintaining the particulate catalyst size in said bed in a narrow range larger than 40 mesh USS;
   (b) adding a contact particle to said liquid gas-oil feed prior to its entry into said reaction zone, said contact particle having a size in a narrow range smaller than 40 mesh USS and wherein said contact particle is a high surface area silica-alumina having affinity for the nitrogen content of said feed;
   (c) passing said mixture of liquid gas-oil and contact particle upwardly through said reaction zone;
   (d) maintaining the velocity of said mixture and hydrogen-containing gas sufficient so as to expand said bed of catalyst to between 20 and 100 percent of its settled state;
   (e) removing nitrogen-containing silica-alumina particle from the reaction zone in the liquid effluent;
   (f) separating said silica-alumina particle from said effluent; and
   (g) recovering a hydrocracked gas-oil from said effluent.

5. The process of claim 4 wherein the catalyst is a sulfided nickel-tungsten on silica-alumina and the contact particle is silica-alumina gel.

6. The process of claim 4 wherein the reaction zone is operated at a temperature between 500° and 900° F., a pressure between 800 and 3000 p.s.i.g., a hydrogen throughput from 2500 to about 8000 standard cubic feet per barrel and total space velocity of at least 0.25 $V_f/hr./V_r$.

References Cited

UNITED STATES PATENTS

| | | | |
|---|---|---|---|
| 3,151,060 | 9/1964 | Garbo | 208—213 |
| 2,917,456 | 12/1959 | Ashley | 208—213 |
| 2,443,673 | 6/1948 | Atwell | 208—149 |
| 2,760,917 | 8/1956 | Ward | 208—149 |
| 2,933,446 | 4/1960 | MacLaren | 208—149 |
| 2,943,040 | 6/1960 | Weisz | 208—149 |
| 3,183,180 | 5/1965 | Schuman et al. | 208—216 |

CURTIS R. DAVIS, Primary Examiner

G. J. CRASANAKIS, Assistant Examiner

U.S. Cl. X.R.

208—157, 161, 213, 216, 251 H, 254 H